US008245692B2

(12) United States Patent
Glugla et al.

(10) Patent No.: US 8,245,692 B2
(45) Date of Patent: Aug. 21, 2012

(54) METHOD AND SYSTEM FOR PRE-IGNITION CONTROL

(75) Inventors: Chris Paul Glugla, Macomb, MI (US); Chris Richard Weber, Plymouth, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 12/960,218

(22) Filed: Dec. 3, 2010

(65) Prior Publication Data

US 2011/0139118 A1 Jun. 16, 2011

(51) Int. Cl.
*F02P 5/00* (2006.01)

(52) U.S. Cl. ................... 123/406.29; 701/111

(58) Field of Classification Search ............ 123/310, 123/406.21, 406.29, 406.37; 701/111; 73/114.63
See application file for complete search history.

(56) References Cited

U.S. PATENT DOCUMENTS

| | | | | |
|---|---|---|---|---|
| 4,640,250 A | * | 2/1987 | Hosaka et al. ............ | 123/406.35 |
| 4,648,367 A | * | 3/1987 | Gillbrand et al. ......... | 123/406.26 |
| 5,080,068 A | * | 1/1992 | Sawamoto .................. | 123/435 |
| 5,428,986 A | * | 7/1995 | Dietsche et al. ............ | 73/35.04 |
| 5,632,247 A | * | 5/1997 | Hashizume et al. ........ | 123/406.26 |
| 5,836,285 A | * | 11/1998 | Aoki et al. ................. | 123/406.37 |
| 5,905,193 A | | 5/1999 | Hashizume et al. | |
| 6,105,552 A | | 8/2000 | Arisawa et al. | |
| 6,615,811 B1 | * | 9/2003 | Butler, Jr. .................... | 123/606 |
| 6,971,360 B2 | | 12/2005 | Katayama | |
| 7,131,425 B2 | * | 11/2006 | Ramappan et al. ....... | 123/406.21 |
| 7,347,081 B2 | * | 3/2008 | Inoue et al. ................. | 73/35.09 |
| 7,516,647 B2 | * | 4/2009 | Kluth et al. ................. | 73/35.03 |
| 7,673,614 B2 | | 3/2010 | Inada et al. | |
| 7,673,616 B2 | * | 3/2010 | Kolmanovsky et al. . | 123/406.37 |
| 7,685,996 B2 | | 3/2010 | Brehob | |
| 7,798,125 B2 | | 9/2010 | Barrett et al. | |
| 2009/0308146 A1 | | 12/2009 | Gautrot et al. | |
| 2011/0093186 A1 | * | 4/2011 | Hagari et al. ............... | 701/111 |
| 2011/0144893 A1 | * | 6/2011 | Rollinger et al. ........... | 701/111 |
| 2011/0191007 A1 | * | 8/2011 | Glugla et al. .............. | 701/103 |
| 2011/0202260 A1 | * | 8/2011 | Cunningham et al. ...... | 701/104 |
| 2011/0246049 A1 | * | 10/2011 | Matsuo et al. .............. | 701/111 |

FOREIGN PATENT DOCUMENTS

| | | |
|---|---|---|
| DE | 19643755 A1 | 4/1998 |
| EP | 0 819 925 A2 | 1/1998 |
| EP | 1 260 806 A2 | 11/2002 |
| EP | 1715179 A2 | 10/2006 |
| JP | 11093757 A * | 4/1999 |
| JP | 11247750 A | 9/1999 |
| JP | 2007032407 A | 2/2007 |

* cited by examiner

*Primary Examiner* — Mahmoud Gimie
*Assistant Examiner* — David Hamaoui
(74) *Attorney, Agent, or Firm* — Julia Voutyras; Alleman Hall McCoy Russell & Tuttle LLP (57) ABSTRACT

Methods and systems are provided for identifying and differentiating knock and pre-ignition using a plurality of knock sensors distributed along an engine block. By dynamically adjusting cylinder-specific assignment of the knock sensors for knock detection and pre-ignition detection based on operating conditions of each cylinder, knock and pre-ignition is more reliably identified and distinguished.

10 Claims, 7 Drawing Sheets

400

| Vehicle operating conditions | Cylinder 1 |
|---|---|
| Low speed-low load | Knock – sensor 1<br>PI – sensor 2 |
| High speed-high load | Knock – sensor 2<br>PI – sensor 1 |
| Low speed-high load | Knock – sensor 1<br>PI – sensor 1 |
| High speed-low load | Knock – sensor 2<br>PI – sensor 2 |
| High speed-medium load | Knock – sensor 1<br>PI – sensors 1+2 |
| Low speed-medium load | Knock – sensor 2<br>PI – sensors 1+2 |
| Medium speed-high load | Knock – sensors 1+2<br>PI – sensor 1 |
| Medium speed-low load | Knock – sensors 1+2<br>PI – sensor 2 |
| Medium speed-medium load | Knock – sensors 1+2<br>PI – sensors 1+2 |

| Vehicle operating conditions | Cylinder 1 |
|---|---|
| Low speed-low load | Knock – sensor 1<br>PI – sensor 2 |
| High speed-high load | Knock – sensor 2<br>PI – sensor 1 |
| Low speed-high load | Knock – sensor 1<br>PI – sensor 1 |
| High speed-low load | Knock – sensor 2<br>PI – sensor 2 |
| High speed-medium load | Knock – sensor 1<br>PI – sensors 1+2 |
| Low speed-medium load | Knock – sensor 2<br>PI – sensors 1+2 |
| Medium speed-high load | Knock – sensors 1+2<br>PI – sensor 1 |
| Medium speed-low load | Knock – sensors 1+2<br>PI – sensor 2 |
| Medium speed-medium load | Knock – sensors 1+2<br>PI – sensors 1+2 |

FIG. 4

| Vehicle operating conditions | Cylinder 1 | Cylinder 2 | | Cylinder n |
|---|---|---|---|---|
| Condition 1 | Knock – sensor 1<br>PI – sensor 2 | Knock – sensor 2<br>PI – sensor 1 | | Knock – sensor 1<br>PI – sensor 2 |
| Condition 2 | Knock – sensor 2<br>PI – sensor 1 | Knock – sensor 1<br>PI – sensor 2 | | Knock – sensor 1<br>PI – sensor 2 |
| Condition 3 | Knock – sensor 1<br>PI – sensor 2 | Knock – sensor 1<br>PI – sensor 2 | | Knock – sensor 2<br>PI – sensor 1 |
| Condition 4 | Knock – sensor 2<br>PI – sensor 1 | Knock – sensor 2<br>PI – sensor 1 | | Knock – sensor 2<br>PI – sensor 1 |
| Condition 5 | Knock – sensor 1<br>PI – sensor 1 | Knock – sensor 2<br>PI – sensor 2 | | Knock – sensor 2<br>PI – sensor 2 |
| Condition 6 | Knock – sensor 2<br>PI – sensor 2 | Knock – sensor 1<br>PI – sensor 1 | | Knock – sensor 1<br>PI – sensor 1 |
| Condition 7 | Knock – sensor 1<br>PI – sensor 1 | Knock – sensor 1<br>PI – sensor 1 | | Knock – sensor 2<br>PI – sensor 2 |
| Condition 8 | Knock – sensor 2<br>PI – sensor 2 | Knock – sensor 2<br>PI – sensor 2 | | Knock – sensor 1<br>PI – sensor 1 |
| Condition 9 | Knock – sensor 1<br>PI – sensor 1 | Knock – sensor 1<br>PI – sensor 2 | | Knock – sensor 2<br>PI – sensor 1 |
| Condition 10 | Knock – sensor 1<br>PI – sensor 2 | Knock – sensor 1<br>PI – sensor 1 | | Knock – sensor 1<br>PI – sensor 2 |
| Condition 11 | Knock – sensor 2<br>PI – sensor 1 | Knock – sensor 2<br>PI – sensor 2 | | Knock – sensor 1<br>PI – sensor 2 |
| Condition 12 | Knock – sensor 2<br>PI – sensor 2 | Knock – sensor 2<br>PI – sensor 1 | | Knock – sensor 2<br>PI – sensor 1 |
| Condition 13 | Knock – sensor 1<br>PI – sensor 1 | Knock – sensor 2<br>PI – sensor 1 | | Knock – sensor 2<br>PI – sensor 2 |
| Condition 14 | Knock – sensor 2<br>PI – sensor 1 | Knock – sensor 1<br>PI – sensor 1 | | Knock – sensor 1<br>PI – sensor 1 |
| Condition 15 | Knock – sensor 2<br>PI – sensor 2 | Knock – sensor 1<br>PI – sensor 2 | | Knock – sensor 2<br>PI – sensor 2 |
| Condition 16 | Knock – sensor 1<br>PI – sensor 2 | Knock – sensor 2<br>PI – sensor 2 | | Knock – sensor 1<br>PI – sensor 1 |

FIG. 5

| Operating conditions | Cylinder 1 | Cylinder 2 |
|---|---|---|
| Condition 1 | Knock - sensors 1+2<br>PI - sensor 1 | Knock - sensor 1<br>PI - sensor 1 |
| Condition 2 | Knock - sensors 1+2<br>PI - sensor 1 | Knock - sensor 2<br>PI - sensor 2 |
| Condition 3 | Knock - sensors 1+2<br>PI - sensor 1 | Knock - sensor 1<br>PI - sensor 2 |
| Condition 4 | Knock - sensors 1+2<br>PI - sensor 1 | Knock - sensor 2<br>PI - sensor 1 |
| Condition 5 | Knock - sensors 1+2<br>PI - sensor 2 | Knock - sensor 1<br>PI - sensor 1 |
| Condition 6 | Knock - sensors 1+2<br>PI - sensor 2 | Knock - sensor 2<br>PI - sensor 2 |
| Condition 7 | Knock - sensors 1+2<br>PI - sensor 2 | Knock - sensor 1<br>PI - sensor 2 |
| Condition 8 | Knock - sensors 1+2<br>PI - sensor 2 | Knock - sensor 2<br>PI - sensor 1 |
| Condition 9 | Knock - sensors 1+2<br>PI - sensors 1+2 | Knock - sensor 1<br>PI - sensor 1 |
| Condition 10 | Knock - sensors 1+2<br>PI - sensors 1+2 | Knock - sensor 2<br>PI - sensor 2 |

| Operating conditions | Cylinder 1 | Cylinder 2 |
|---|---|---|
| Condition 11 | Knock - sensor 1<br>PI - sensors 1+2 | Knock - sensor 1<br>PI - sensor 1 |
| Condition 12 | Knock - sensor 1<br>PI - sensors 1+2 | Knock - sensor 2<br>PI - sensor 2 |
| Condition 13 | Knock - sensor 1<br>PI - sensors 1+2 | Knock - sensor 1<br>PI - sensor 2 |
| Condition 14 | Knock - sensor 2<br>PI - sensors 1+2 | Knock - sensor 2<br>PI - sensor 1 |
| Condition 15 | Knock - sensor 2<br>PI - sensors 1+2 | Knock - sensor 1<br>PI - sensor 1 |
| Condition 16 | Knock - sensor 2<br>PI - sensors 1+2 | Knock - sensor 2<br>PI - sensor 2 |
| Condition 17 | Knock - sensor 1<br>PI - sensor 1 | Knock - sensors 1+2<br>PI - sensor 1 |
| Condition 18 | Knock - sensor 2<br>PI - sensor 2 | Knock - sensors 1+2<br>PI - sensor 1 |
| Condition 19 | Knock - sensor 1<br>PI - sensor 2 | Knock - sensors 1+2<br>PI - sensor 1 |
| Condition 20 | Knock - sensor 2<br>PI - sensor 1 | Knock - sensors 1+2<br>PI - sensor 1 |

| Operating conditions | Cylinder 1 | Cylinder 2 |
|---|---|---|
| Condition 21 | Knock - sensor 1<br>PI - sensor 1 | Knock - sensors 1+2<br>PI - sensor 2 |
| Condition 22 | Knock - sensor 2<br>PI - sensor 2 | Knock - sensors 1+2<br>PI - sensor 2 |
| Condition 23 | Knock - sensor 1<br>PI - sensor 2 | Knock - sensors 1+2<br>PI - sensor 2 |
| Condition 24 | Knock - sensor 2<br>PI - sensor 1 | Knock - sensors 1+2<br>PI - sensor 2 |
| Condition 25 | Knock - sensor 1<br>PI - sensor 1 | Knock - sensor 1<br>PI - sensors 1+2 |
| Condition 26 | Knock - sensor 2<br>PI - sensor 2 | Knock - sensor 1<br>PI - sensors 1+2 |
| Condition 27 | Knock - sensor 1<br>PI - sensor 2 | Knock - sensor 2<br>PI - sensors 1+2 |
| Condition 28 | Knock - sensor 2<br>PI - sensor 1 | Knock - sensor 1<br>PI - sensors 1+2 |
| Condition 29 | Knock - sensor 1<br>PI - sensor 1 | Knock - sensor 2<br>PI - sensors 1+2 |
| Condition 30 | Knock - sensor 2<br>PI - sensor 2 | Knock - sensor 2<br>PI - sensors 1+2 |

| Operating conditions | Cylinder 1 | Cylinder 2 |
|---|---|---|
| Condition 31 | Knock - sensor 1<br>PI - sensors 1+2 | Knock - sensors 1+2<br>PI - sensors 1+2 |
| Condition 32 | Knock - sensor 2<br>PI - sensors 1+2 | Knock - sensors 1+2<br>PI - sensors 1+2 |
| Condition 33 | Knock - sensors 1+2<br>PI - sensors 1+2 | Knock - sensor 1<br>PI - sensors 1+2 |
| Condition 34 | Knock - sensors 1+2<br>PI - sensors 1+2 | Knock - sensor 2<br>PI - sensors 1+2 |
| Condition 35 | Knock - sensor 1<br>PI - sensors 1+2 | Knock - sensor 2<br>PI - sensors 1+2 |
| Condition 36 | Knock - sensor 1<br>PI - sensors 1+2 | Knock - sensor 2<br>PI - sensor 1 |
| Condition 37 | Knock - sensor 1<br>PI - sensor 2 | Knock - sensors 1+2<br>PI - sensor 1 |
| Condition 38 | Knock - sensors 1+2<br>PI - sensor 1 | Knock - sensor 2<br>PI - sensor 2 |
| Condition 39 | Knock - sensors 1+2<br>PI - sensor 2 | Knock - sensor 1<br>PI - sensor 2 |
| Condition 40 | Knock - sensors 1+2<br>PI - sensor 1 | Knock - sensors 1+2<br>PI - sensor 1 |

| Operating conditions | Cylinder 1 | Cylinder 2 |
|---|---|---|
| Condition 41 | Knock - sensor 1<br>PI - sensor 1 | Knock - sensors 1+2<br>PI - sensor 1 |
| Condition 42 | Knock - sensor 2<br>PI - sensor 2 | Knock - sensors 1+2<br>PI - sensor 2 |
| Condition 43 | Knock - sensor 1<br>PI - sensor 2 | Knock - sensors 1+2<br>PI - sensors 1+2 |
| Condition 44 | Knock - sensor 2<br>PI - sensor 1 | Knock - sensors 1+2<br>PI - sensors 1+2 |
| Condition 45 | Knock - sensors 1+2<br>PI - sensor 1 | Knock - sensor 1<br>PI - sensors 1+2 |
| Condition 46 | Knock - sensors 1+2<br>PI - sensor 2 | Knock - sensor 2<br>PI - sensors 1+2 |
| Condition 47 | Knock - sensors 1+2<br>PI - sensor 1 | Knock - sensor 1<br>PI - sensor 1 |
| Condition 48 | Knock - sensors 1+2<br>PI - sensor 2 | Knock - sensor 2<br>PI - sensor 2 |
| Condition 49 | Knock - sensors 1+2<br>PI - sensor 1 | Knock - sensor 1<br>PI - sensor 2 |
| Condition 50 | Knock - sensors 1+2<br>PI - sensor 2 | Knock - sensor 2<br>PI - sensor 1 |

| Operating conditions | Cylinder 1 | Cylinder 2 |
|---|---|---|
| Condition 51 | Knock - sensors 1+2<br>PI - sensors 1+2 | Knock - sensor 1<br>PI - sensor 2 |
| Condition 52 | Knock - sensors 1+2<br>PI - sensors 1+2 | Knock - sensor 2<br>PI - sensor 1 |
| Condition 53 | Knock - sensor 1<br>PI - sensor 1 | Knock - sensors 1+2<br>PI - sensors 1+2 |
| Condition 54 | Knock - sensor 2<br>PI - sensor 2 | Knock - sensors 1+2<br>PI - sensors 1+2 |
| Condition 55 | Knock - sensor 1<br>PI - sensor 2 | Knock - sensors 1+2<br>PI - sensors 1+2 |
| Condition 56 | Knock - sensor 2<br>PI - sensor 1 | Knock - sensors 1+2<br>PI - sensors 1+2 |
| Condition 57 | Knock - sensors 1+2<br>PI - sensors 1+2 | Knock - sensor 1<br>PI - sensor 1 |
| Condition 58 | Knock - sensors 1+2<br>PI - sensors 1+2 | Knock - sensor 2<br>PI - sensor 2 |
| Condition 59 | Knock - sensors 1+2<br>PI - sensor 1 | Knock - sensor 1<br>PI - sensors 1+2 |
| Condition 60 | Knock - sensors 1+2<br>PI - sensor 2 | Knock - sensor 2<br>PI - sensors 1+2 |

| Operating conditions | Cylinder 1 | Cylinder 2 |
|---|---|---|
| Condition 61 | Knock - sensors 1+2<br>PI - sensors 1+2 | Knock - sensors 1+2<br>PI - sensors 1+2 |
| Condition 62 | Knock - sensor 2<br>PI - sensors 1+2 | Knock - sensors 1+2<br>PI - sensors 1+2 |
| Condition 63 | Knock - sensors 1+2<br>PI - sensors 1 | Knock - sensors 1+2<br>PI - sensors 1+2 |
| Condition 64 | Knock - sensors 1+2<br>PI - sensors 2 | Knock - sensors 1+2<br>PI - sensors 1+2 |
| Condition 65 | Knock - sensors 1+2<br>PI - sensors 1+2 | Knock - sensors 1+2<br>PI - sensors 1+2 |

METHOD AND SYSTEM FOR PRE-IGNITION CONTROL

FIELD

The present description relates generally to methods and systems for detecting pre-ignition in a vehicle engine.

BACKGROUND/SUMMARY

Under certain operating conditions, engines that have high compression ratios, or are boosted to increase specific output, may be prone to low speed pre-ignition combustion events. The early combustion due to pre-ignition can cause very high in-cylinder pressures, and can result in combustion pressure waves similar to combustion knock, but with larger intensity. Such pre-ignition events can cause rapid engine degradation. Accordingly, strategies have been developed for early detection of pre-ignition based on engine operating conditions.

One example approach is illustrated by Hashizume in U.S. Pat. No. 5,632,247. Therein, pre-ignition and knock for a cylinder is detected by a knock sensor attached to the cylinder block. Specifically, based on an estimation of the knock sensor reading in two different timing windows, each with differing thresholds, pre-ignition is determined and differentiated from knock.

However, the inventors herein have identified potential issues with such an approach. In one example, the sensitivity of the approach may vary depending on the positioning of the sensor. For example, the sensor location for reliably identifying knock in the cylinder may not align with the sensor location for reliably identifying pre-ignition in the cylinder. In another example, the presence of multiple sensors (one knock sensor per cylinder) adds to component costs without necessarily improving the performance of either knock or pre-ignition detection in the cylinder. As such, the reduced accuracy of engine pre-ignition determination and differentiation (from knock) may lead to rapid engine degradation.

Thus in one example, some of the above issues may be addressed by a method of operating an engine including a plurality of knock sensors distributed on an engine block. In one embodiment, the method comprises, during engine operation, dynamically selecting a knock-indicating sensor from among the plurality of knock sensors for identifying knock in the cylinder, and dynamically selecting a pre-ignition-indicating sensor from among the plurality of knock sensors for identifying pre-ignition in the cylinder, the selections based on operating conditions.

In one example, a vehicle engine may include a first and a second knock sensor distributed at different positions along the engine block. During a first condition (such as based on the engine speed-load conditions, cylinder position, and cylinder firing order), knock and pre-ignition may be identified in a first cylinder based on the first knock sensor while knock and pre-ignition is identified in a second cylinder based on the second knock sensor. In comparison, during a second condition, knock and pre-ignition may be identified in the first cylinder based on the second knock sensor while knock and pre-ignition is identified in the second cylinder based on the first knock sensor. In this way, by assigning different knock sensors to each cylinder based on engine operating conditions, the knock and pre-ignition detection sensitivity for each cylinder can be improved with fewer knock sensors.

In another example, during a first condition, cylinder knock (in any given cylinder) may be identified based on the first knock sensor while cylinder pre-ignition is identified based on the second knock sensor. During a second condition, cylinder knock in the given cylinder may be identified based on the second knock sensor while cylinder pre-ignition is identified based on the first knock sensor. During still other conditions, each of knock and pre-ignition in the given cylinder may be identified based on the first or the second sensor.

It will be appreciated that while the above-mentioned examples illustrate the concept using two knock sensors and two cylinders, this is not meant to be limiting. As such, for a given cylinder, knock or pre-ignition may be identified based on one or more of a plurality of knock sensors distributed along the engine block. Therein, the one or more knock-indicating sensors may or may not overlap with the one or more pre-ignition-indicating sensors.

In this way, by improving the sensitivity of cylinder knock and pre-ignition detection, abnormal cylinder combustion events may be identified more accurately. By enhancing the differentiation of cylinder knock events from cylinder pre-ignition events, appropriate mitigating steps can be taken. By improving the accuracy and response time of pre-ignition detection and mitigation, engine degradation due to pre-ignition can be reduced. By improving the accuracy and response time of knock detection, fuel economy benefits may be achieved. Further, by using the same knock sensor to identify both knock and pre-ignition in each cylinder, synergistic benefits may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4-6 show tables with example sensor combinations for cylinder knock and pre-ignition detection.

DETAILED DESCRIPTION

Figure 1:
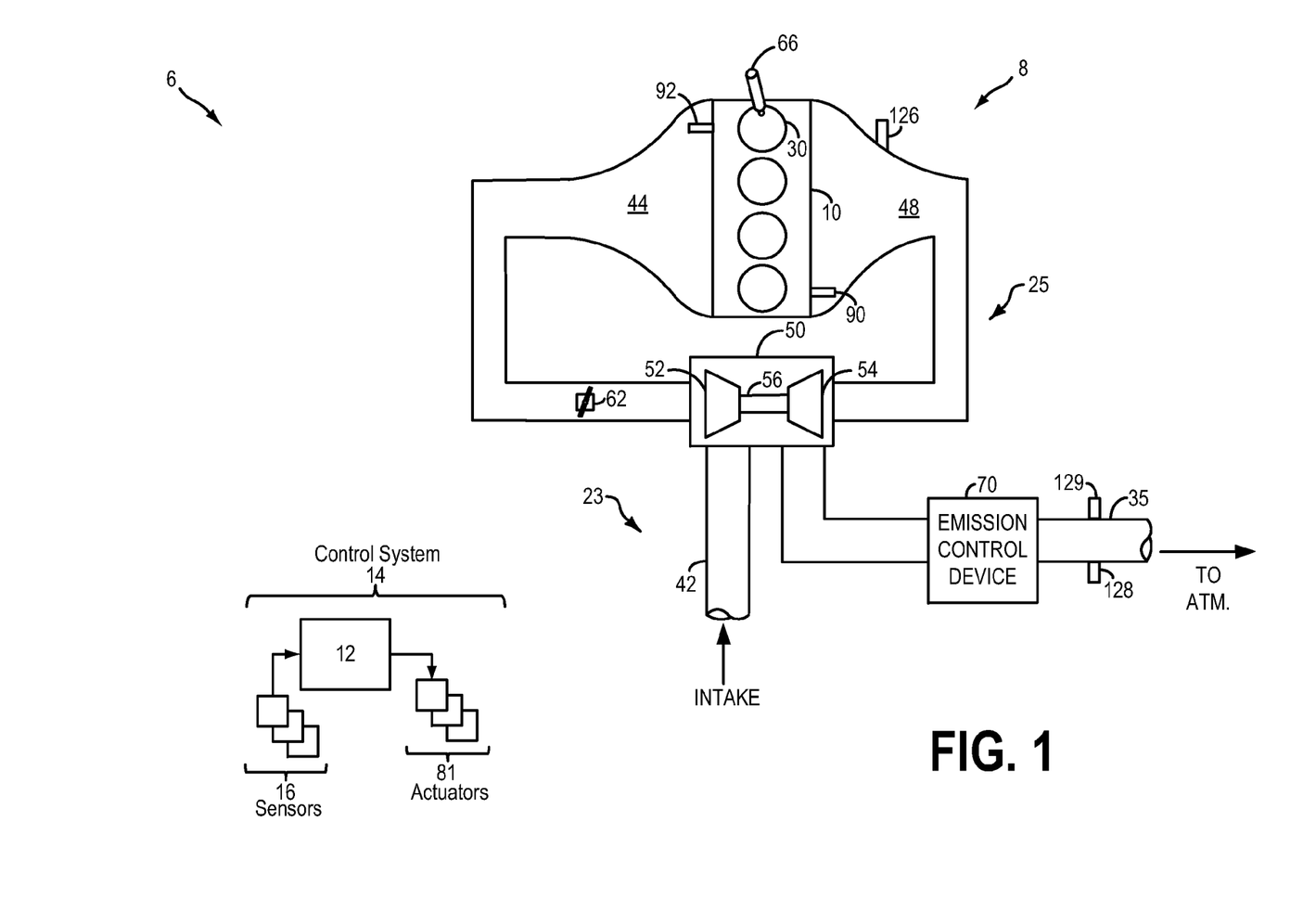
FIG. 1 shows an example engine system with a plurality of knock sensors.
Figure 7:
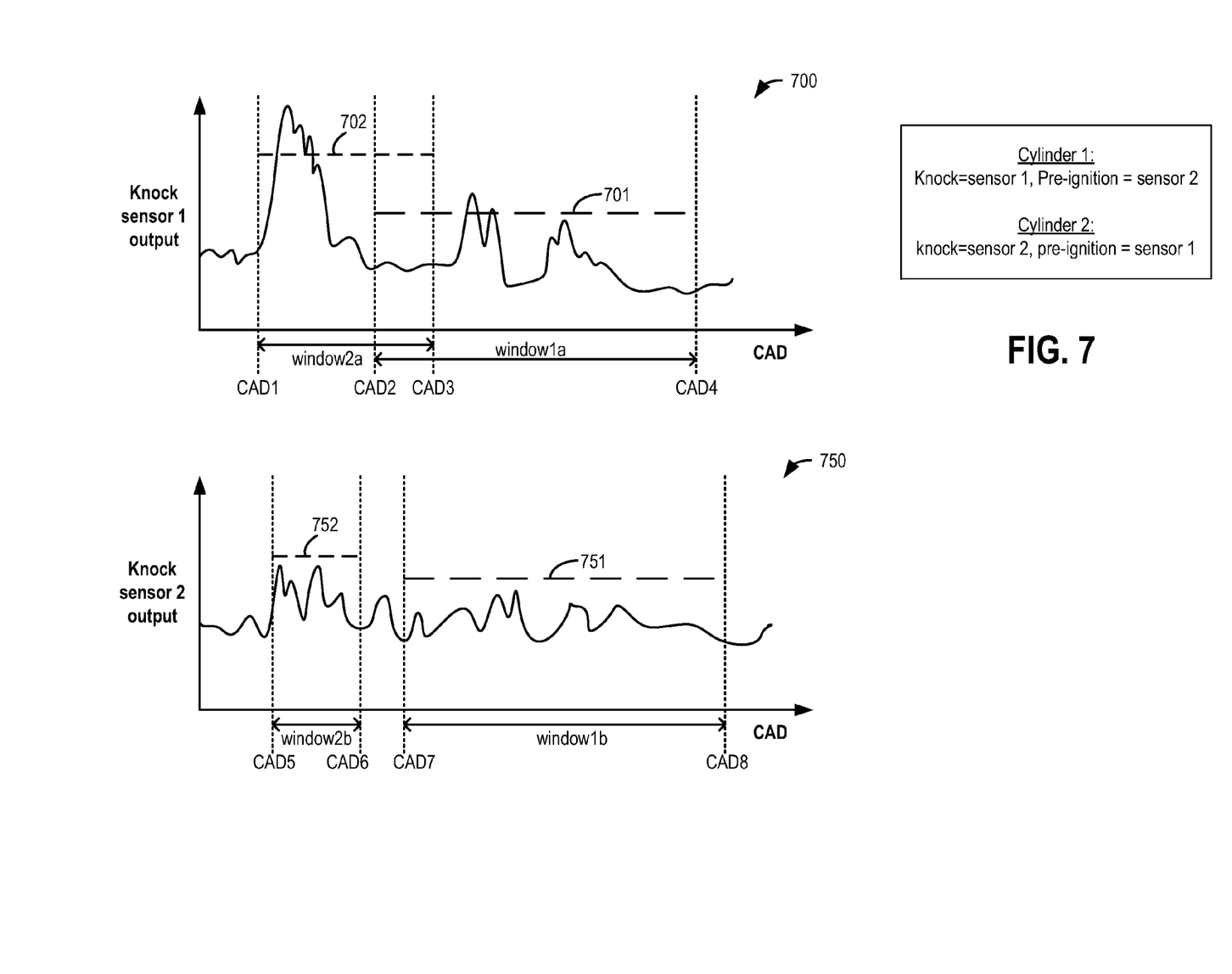
FIG. 7 shows an example of knock and pre-ignition differentiation in an engine cylinder, based on the output of one or more knock sensors, according to the present disclosure.

The following description relates to systems and methods for identifying and differentiating cylinder knock and pre-ignition using a plurality of knock sensors distributed along an engine block, as shown in the engine system of FIG. 1. As elaborated herein with reference to FIG. 3, an engine controller may dynamically select one or more knock-indicating sensors and one or more pre-ignition-indicating sensors from among the plurality of knock sensors for identifying knock and pre-ignition in each cylinder. The selection may be performed for each cylinder based on the operating conditions of the given cylinder (such as, engine speed-load conditions, the firing order of the cylinder, etc.). Example sensor combinations are illustrated in the tables of FIGS. 4-6. By dynamically adjusting the sensor combination used for each cylinder based on operating conditions, both knock and pre-ignition detection sensitivity for each cylinder may be improved. As shown in FIG. 7, by assessing the output of the selected knock sensor(s) in different timing windows, and with regards to different thresholds, pre-ignition events may be more reliably differentiated from knocking events. By improving the accuracy of knock and pre-ignition detection and differentiation, appropriate mitigating actions can be rapidly executed, thereby reducing engine degradation due to abnormal combustion events.

FIG. 1 shows a schematic depiction of a vehicle system 6 including an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger, and upstream of an after-cooler (not shown). As such, the after-cooler may be configured to reduce the temperature of the intake air compressed by the boosting device. Turbocharger 50 may include a compressor 52, arranged between intake passage 42 and intake manifold 44. Compressor 52 may be at least partially powered by exhaust turbine 54, arranged between exhaust manifold 48 and exhaust passage 35, via turbine shaft 56.

Engine exhaust 25 may include one or more emission control devices 70, which may be mounted in a close-coupled position in the exhaust. One or more emission control devices may include a three-way catalyst, lean NOx filter, SCR catalyst, PM filter, etc.

Engine system 8 may further include a plurality of knock sensors distributed along engine block 11. In the depicted example, engine system 8 is shown with a first knock sensor 90 located at one end of the cylinder block and a second knock sensor 92 located (symmetrically) at the other end of the cylinder block. However, it will be appreciated that in alternate embodiments, a larger number of knock sensors may be included. Further, the knock sensors may be distributed symmetrically or asymmetrically along the engine block.

Figure 3:
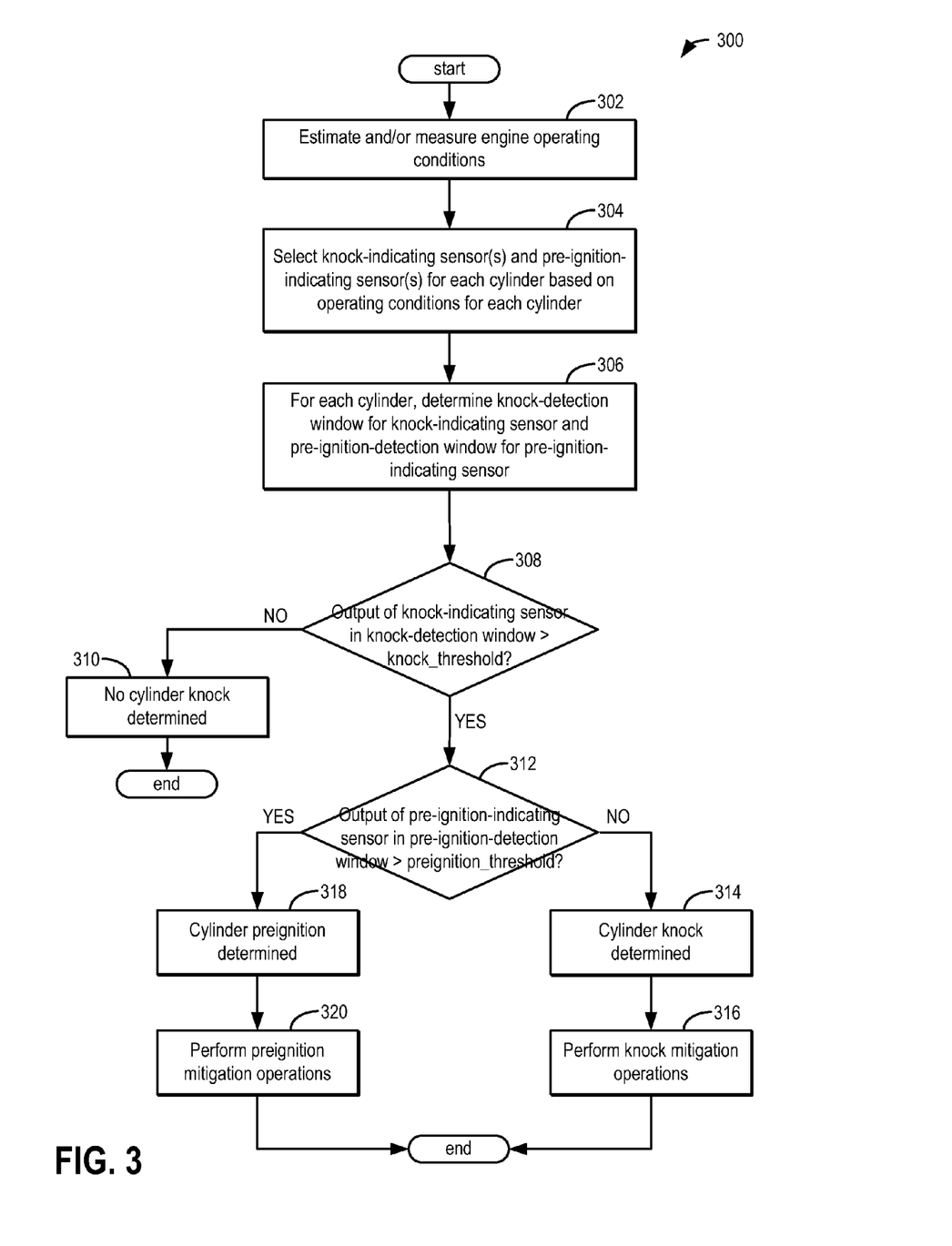
FIG. 3 shows a high level flow chart for selecting a knock-indicating sensor and a pre-ignition indication sensor, from among a plurality of knock sensors, for identifying knock and pre-ignition in each cylinder of the engine of FIG. 1.
Figure 4:
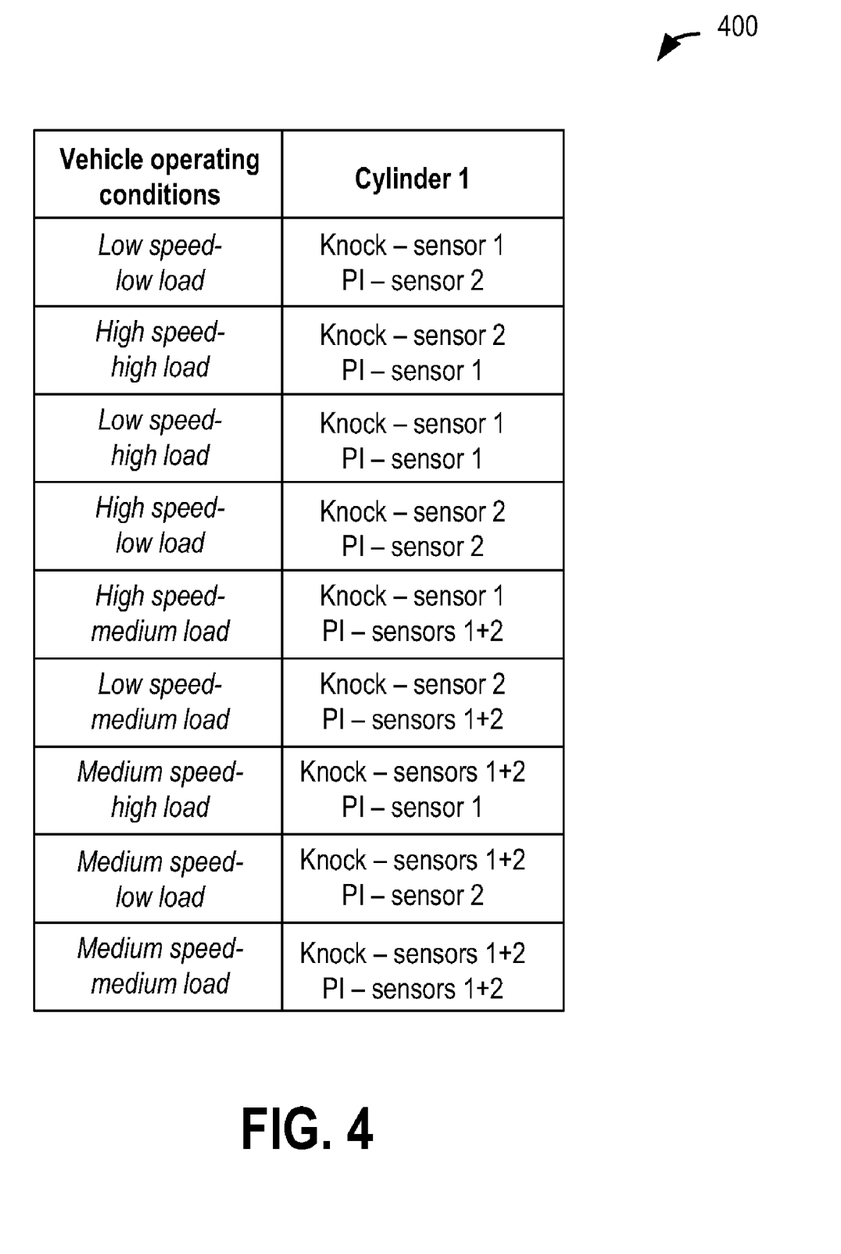

As elaborated in FIG. 3, an engine controller may be configured to select one or more of knock sensors 90, 92 for indicating knock and pre-ignition in each cylinder, the selection based on engine operating conditions. By positioning the knock sensors are different locations within the engine block, and dynamically adjusting the selection of sensors during engine combustion, an improved signal to noise ratio for detecting both pre-ignition and knock in each of the engine cylinders may be achieved.

The engine controller may also be configured to differentiate abnormal combustion events due to cylinder knocking from those indicative of cylinder pre-ignition based on the selected knock sensors. As such, knock sensors 90, 92 may be an accelerometer, or an ionization sensor. As elaborated in FIGS. 3 and 7, based on the output of the selected knock sensor, such as based on a signal timing, amplitude, intensity, frequency, etc., the controller may differentiate knock from pre-ignition. In one example, a cylinder pre-ignition event may be determined based on a cylinder knock signal estimated in a first, earlier window being larger than a first, higher threshold, while a cylinder knock event may be determined based on a cylinder knock signal estimated in a second, later window being larger than a second, lower threshold. In one example, the windows in which the knock signals are estimated may be crank angle windows.

Mitigating actions taken by the engine controller to address knock may also differ from those taken by the controller to address pre-ignition. For example, knock may be addressed using ignition spark timing adjustments (e.g., spark retard) and EGR, while pre-ignition may be addressed using load-limiting and fuel enrichment.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), knock sensors 90 and 92, temperature sensor 128, and pressure sensor 129 (located downstream of emission control device 70). Other sensors such as pressure, temperature, air/fuel ratio, and composition sensors may be coupled to various locations in the vehicle system 6, as discussed in more detail herein. As another example, the actuators may include fuel injectors 66, and throttle 62. The control system 14 may include a controller 12. The controller may receive input data from the various sensors, process the input data, and trigger the actuators in response to the processed input data based on instruction or code programmed therein corresponding to one or more routines. An example control routine is described herein with reference to FIG. 3.

Figure 2:
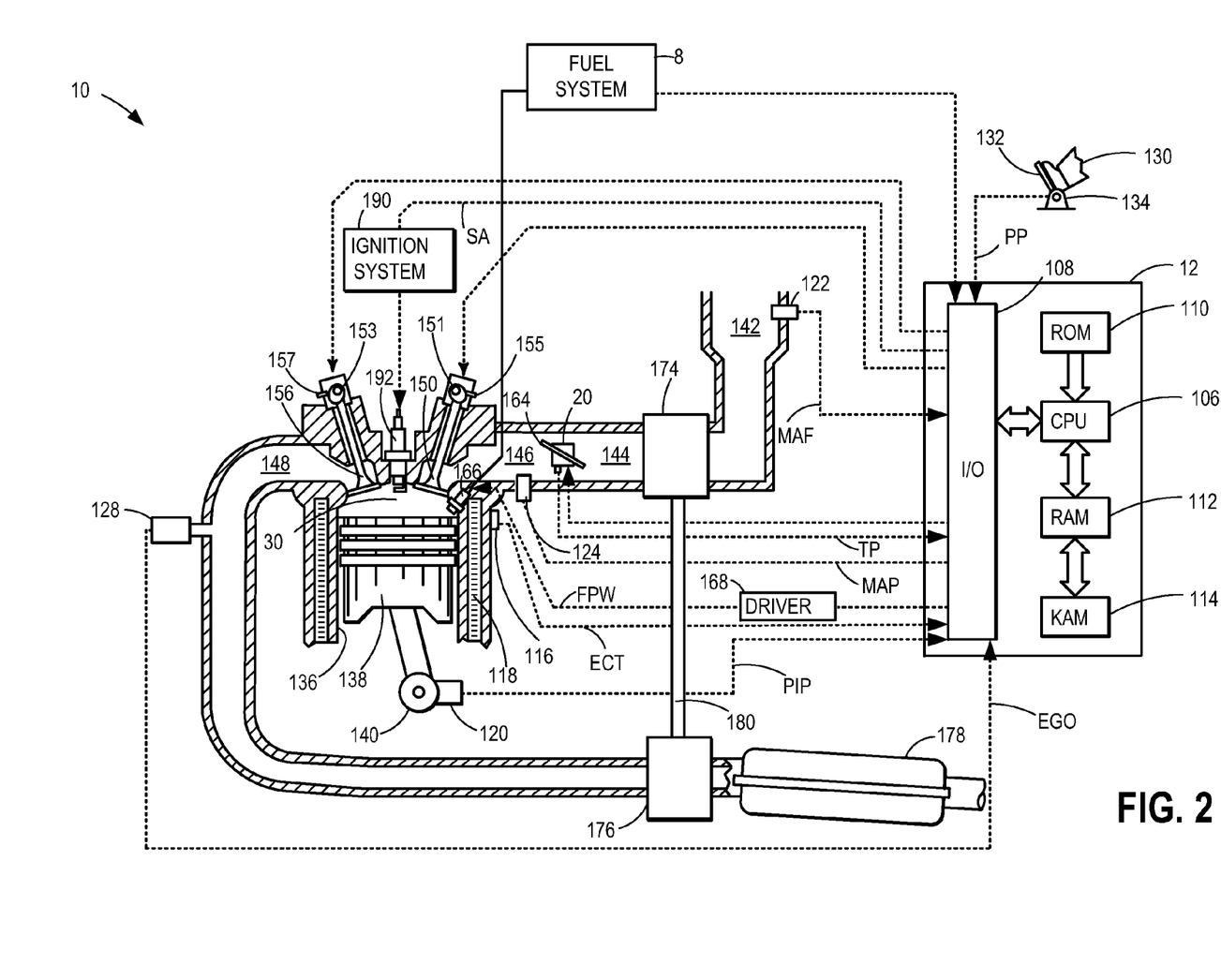
FIG. 2 shows an example combustion chamber.

FIG. 2 depicts an example embodiment of a combustion chamber or cylinder of internal combustion engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Now turning to FIG. 3, an example routine 300 is described for selecting one or more knock sensors from a plurality of knock sensors to determine knock and pre-ignition in each cylinder based on operating conditions. By dynamically adjusting the selection of knock sensors during engine operation based on real-time operating conditions of each cylinder, the accuracy and speed of detection and differentiation of abnormal combustion events in each cylinder of the engine can be improved.

At 302, engine operating conditions may be estimated and/or measured. The operating conditions determined may include, for example, engine speed, torque, engine load, engine temperature, engine manifold pressure, air temperature, etc. Cylinder-specific conditions for each cylinder may also be determined, such as cylinder pressure (IMEP), cylinder temperature, cylinder air charge, etc. At 304, one or more knock-indicating sensors may be dynamically selected from among the plurality of knock sensors on the engine block for identifying knock in each cylinder based on the estimated operating conditions. Additionally, one or more pre-ignition-indicating sensors may be dynamically selected from among the plurality of knock sensors on the engine block for identifying pre-ignition in the cylinder based on the estimated operating conditions.

As elaborated herein with reference to the tables of FIGS. 4-5, during some conditions a single sensor may be selected for indicating knock and pre-ignition in a given cylinder. Herein, in one example, the knock-indicating sensor may be same as the pre-ignition indicating sensor, while in an alternate example, the knock-indicating sensor may be different from the pre-ignition indicating sensor. During other conditions, as elaborated in the table of FIG. 6, a plurality of knock-indicating sensors may be selected from among the plurality of knock sensors for indicating cylinder knock and/or a plurality of pre-ignition-indicating sensors may be selected from among the plurality of knock sensors for indicating cylinder pre-ignition. Therein, in one example, at least one of the knock-indicating sensors may be the same as at least one of the pre-ignition indicating sensors, while in an alternate example, each of the plurality of knock-indicating sensors may be different from each of the plurality of pre-ignition indicating sensors.

The selections may be pre-mapped and stored in a look-up table (for example, in a speed-load based map) in the controller's memory, and accessed by the controller during engine operation and cylinder combustion. In some embodiments, during mapping, one or more knock sensors may be selected for a cylinder based on the respective cylinder's operating conditions taking into consideration other cylinder details, such as the cylinder's location on the engine block, the cylinder's firing order, etc. For example, under otherwise identical engine operating conditions, the selection may vary based on whether the cylinder is in an in-line engine, or whether the cylinder is on a V-type engine (and further, which bank therein). Similarly, under otherwise identical engine operating conditions, the selection may vary based on the firing order of the cylinder.

In another example, the sensor selections may be dynamically determined (e.g., in real-time) during engine operation and cylinder combustion. For example, the dynamic selection may be repeated at fixed intervals (e.g., after a defined amount of time, or after a defined number of combustion events). Alternatively, the dynamic selection may be repeated in response to a change in engine speed and/or load (e.g., in response to a threshold change in speed or load). By adjusting the sensor selection primarily and dynamically in response to engine operating conditions, and not based on other factors (such as, acoustic signals), the accuracy of knock and pre-ignition detection can be maintained under substantially all engine operating conditions, and at any given point during engine operation, knock and pre-ignition can be reliably differentiated.

At 306, for each cylinder, a knock window may be determined for the knock-indicating sensor(s) and a pre-ignition window may be determined for the pre-ignition indicating sensor(s), based on the estimated operating conditions. The knock window may be a first, later window while the pre-ignition window may be a second, earlier window. In one example, the knock window and the pre-ignition window may be completely distinct, with no overlap. In another example, the first knock window may partially overlap with the second pre-ignition window. In still another example, the first and second windows may fully overlap (for example, one window within the other window). In one embodiment, the knock window and pre-ignition window may be crank angle timing windows. However, other timing windows may also be possible. By estimating the output of the selected sensors in distinct windows, abnormal combustion events related to cylinder knock may be more reliably differentiated from abnormal combustion events related to pre-ignition. Additionally, knock and pre-ignition thresholds for the respective windows may also be determined based on the estimated operating conditions.

In one example, the knock and pre-ignition detection windows and thresholds may be selected based on the sensor selections. For example, for a given cylinder, the knock detection window (and threshold) may be based on the knock-indicating sensor selected while the pre-ignition detection window (and threshold) is based on the pre-ignition indicating sensor selected. In another example, knock and pre-ignition detection windows may be determined for each cylinder and sensor selections may be based on, or adjusted based on, the window selection. For example, as elaborated herein, during some conditions, the knock or pre-ignition window may be broadened, and the sensor selection may be adjusted based on the broadened window (e.g., the number of sensors used for indicating knock or pre-ignition may be increased in the broadened window). In still other examples, the knock and pre-ignition detection windows (and thresholds) may be determined independent of the selection of knock-indicating sensors and pre-ignition-indicating sensors.

At 308, the output of the knock-indicating sensor may be estimated in the first, later window and it may be determined whether the output exceeds a first (lower) threshold ("knock_threshold"). If no, then at 310, no cylinder knock is determined and the routine may end. In comparison, if the knock-indicating sensor output exceeds the first threshold, the routine may proceed to 312 wherein the output of the pre-ignition-indicating sensor may be estimated in the second, earlier window and it may be determined whether the output exceeds a second (higher) threshold ("preignition_threshold").

If the pre-ignition-indicating sensor output exceeds the second threshold at 312, then at 318, cylinder pre-ignition may be indicated and at 320, pre-ignition mitigating operations may be executed. Indicating cylinder pre-ignition may include setting a diagnostic code and updating a cylinder pre-ignition count in the database. Additionally, an engine pre-ignition count may be updated. In comparison, if the pre-ignition-indicating sensor output does not exceed the threshold, then at 314, cylinder knock may be indicated in response to the knock-indicating sensor output exceeding the threshold, and at 316, knock mitigating operations may be executed. Indicating cylinder knock may include setting an alternate diagnostic code.

Knock-detection windows and threshold may also be pre-determined and stored in the look-up table along with, and based on, the sensor selections. An example of differing windows and thresholds of a first and second knock sensor used to identify and differentiate knock and pre-ignition in a first and second cylinder is elaborated herein with reference to FIG. 7.

As such, the mitigating operations used to address cylinder knock may be different from those used to address cylinder pre-ignition. For example, in response to the indication of cylinder knock, an engine controller may retard ignition spark timing of the affected cylinder. In comparison, in response to the indication of cylinder pre-ignition the controller may enrich fuel injection to the affected cylinder and/or bank of cylinders. The enrichment may be adjusted based on the affected cylinder's pre-ignition count. For example, a degree of enrichment and/or duration of enrichment may be increased as the cylinder pre-ignition count increases. In some embodiments, in addition to the enrichment, a cylinder load may be limited, for example, by adjusting a cam timing of the affected cylinder (or bank of cylinders) to limit an amount of air charge directed to the cylinder (or bank).

In this way, by adjusting the selection of sensors based on engine operating conditions, as well as the knock and pre-ignition detection windows and thresholds for the sensors based on the sensor selection, knock and pre-ignition may be rapidly identified and addressed. As such, this may reduce rapid engine degradation due to pre-ignition.

Now turning to FIG. 4, a table 400 is illustrated that depicts example knock sensor selections for a cylinder in an engine that includes a first and a second knock sensor located at different locations along the engine block. By dynamically adjusting the knock sensor selected for identifying knock and pre-ignition in the cylinder based on engine operating conditions, knock and pre-ignition detection performance for the cylinder can be improved.

In one example, during a first condition, knock and/or pre-ignition may be indicated in the cylinder based on one of the first and second knock sensor, and then during a second condition, knock and/or pre-ignition may be indicated based on the other of the first and second knock sensor. For example, during a first, low speed-low load condition, cylinder knock may be indicated based on the first knock sensor while cylinder pre-ignition may be indicated based on the second knock sensor. In comparison, during a second, high speed-high load condition, knock may be indicated in the cylinder based on the second knock sensor while pre-ignition in the cylinder is indicated based on the first knock sensor. In another example, during a low speed-high load condition, each of knock and pre-ignition may be indicated in the cylinder based on the first knock sensor while during a high speed-low load condition, each of knock and pre-ignition in the cylinder may be indicated based on the second knock sensor.

In this way, by using the same sensor for detecting knock in a cylinder under some conditions, and detecting pre-ignition in the same cylinder under other conditions, the detection sensitivity and reliability for both knock and pre-ignition detection can be improved without the need for additional sensors.

While the above-mentioned conditions depict selecting a single sensor from among the first and the second knock sensor, during still other conditions, each of the first and second knock sensor may be selected. For example, during a first condition, knock may be indicated in the cylinder based on one of the first or second knock sensor while indicating pre-ignition in the cylinder based on each of the first and second knock sensor. In comparison, during a second condition, knock may be indicated in the cylinder based on each of the first and second knock sensor while indicating pre-ignition in the cylinder based on one of the first and second knock sensor.

With reference to the examples depicted table 400, during a first high speed-medium load condition, cylinder knock may be indicated based on the first knock sensor while pre-ignition is indicated based on each of the first and second knock sensor, and during a low speed-medium load condition, cylinder knock may be indicated based on the second knock sensor while pre-ignition is indicated based on each of the first and second knock sensor. In comparison, during a medium speed-high load condition, cylinder knock may be indicated based on the first and second knock sensor while pre-ignition may be indicated based on the first knock sensor. Similarly, during a medium speed-low load condition, cylinder knock may be indicated based on the first and second knock sensor while pre-ignition is indicated based on the second knock sensor. In still further examples, a plurality of sensors may be selected to detect each of knock and pre-ignition in the cylinder, as illustrated in table 400 in the example of medium speed-medium load conditions.

It will be appreciated that while the depicted example is illustrated for making a selection for a cylinder from among two knock sensors, this is not meant to be limiting, and that the selection may be similarly made for the given cylinder from among a plurality of sensors distributed at different locations along the engine block.

Now turning to FIG. 5, table 500 depicts example sensor selections for a first and a second cylinder of an engine that includes a first and a second knock sensor located at different locations along the engine block. By dynamically adjusting the knock sensor selected for identifying knock and pre-ignition in each cylinder from among the knock sensors present based on engine operating conditions, knock and pre-ignition detection sensitivity for each cylinder may be improved using the existing number of knock sensors.

In some embodiments, only one knock sensor may be selected from among the available knock sensors for identifying knock or pre-ignition in each cylinder. In one example, as shown in table 500, during a first condition (condition 1), knock may be indicated in the first cylinder based on the first knock sensor and pre-ignition may be indicated in the same cylinder based on the second knock sensor. At the same time, knock may be indicated in the second cylinder based on the second knock sensor and pre-ignition may be indicated in the same cylinder based on the first knock sensor. In another example, during a second condition (condition 2), knock may be indicated in the first cylinder based on the second knock sensor and pre-ignition may be indicated in the same cylinder based on the first knock sensor, while knock is indicated in the second cylinder based on the first knock sensor and pre-ignition is indicated in the same cylinder based on the second knock sensor. In this way, by using mutually exclusive knock sensors (or sensor combinations) for identifying knock or pre-ignition in the two cylinders, the detection range of each sensor can be widened without reducing detection sensitivity.

In another example (condition 3), knock may be indicated in each of a first and second cylinder based on the first knock sensor while pre-ignition is indicated in each of the first and second cylinder based on the second knock sensor. During an alternate condition (condition 4), knock may be indicated in each of the first and second cylinder based on the second knock sensor while pre-ignition is indicated in each of the first and second cylinder based on the first knock sensor.

In another example (condition 5), each of knock and pre-ignition may be indicated in the first cylinder based on the first knock sensor while each of knock and pre-ignition is indicated in the second cylinder based on the second knock sensor. During an alternate condition (condition 6), each of knock and pre-ignition may be indicated in the first cylinder based on the second knock sensor while each of knock and pre-ignition is indicated in the second cylinder based on the first knock sensor.

During some operating conditions, even though a plurality of knock sensors are available, a single sensor may be ideally positioned to identify both knock and pre-ignition in each of the cylinders. Based on the operating conditions, the single sensor selected for identifying knock and pre-ignition in all the cylinders may be dynamically varied. For example, during a first (condition 7), each of knock and pre-ignition may be indicated in each of the first and second cylinder based on the first knock sensor while during an alternate condition (condition 8), each of knock and pre-ignition may be indicated in each of the first and second cylinder based on the second knock sensor. In one example, during such conditions, the knock and pre-ignition thresholds for each cylinder may be varied, even though the same sensor is used for detecting knock and pre-ignition in the cylinders.

During still other operating conditions, a common knock sensor may be used to indicate knock in each of the cylinders, while different (e.g., mutually exclusive) knock sensors are used to indicate pre-ignition in each of the cylinders. In one example (conditions 9 and 10), knock may be indicated in each of the first and second cylinders based on the first knock sensor while pre-ignition is indicated in the first cylinder based on one of the first and second cylinder, and pre-ignition is indicated in the second cylinder based on the other of the first and second cylinder. In another example (conditions 11 and 12), knock may be indicated in each of the first and second cylinders based on the second knock sensor while pre-ignition is indicated in the first cylinder based on one of the first and second cylinder, and pre-ignition is indicated in the second cylinder based on the other of the first and second cylinder.

In the same way, during other operating conditions, a common knock sensor may be used to indicate pre-ignition in each of the cylinders, while different (e.g., mutually exclusive) knock sensors are used to indicate knock in each of the cylinders. In one example (conditions 13 and 14), pre-ignition may be indicated in each of the first and second cylinders based on the first knock sensor while knock is indicated in the first cylinder based on one of the first and second cylinder, and knock is indicated in the second cylinder based on the other of the first and second cylinder. In another example (conditions 15 and 16), pre-ignition may be indicated in each of the first and second cylinders based on the second knock sensor while knock is indicated in the first cylinder based on one of the first and second cylinder, and knock is indicated in the second cylinder based on the other of the first and second cylinder.

It will be appreciated that while the examples depicted in table 500 illustrate selecting a single knock sensor for each of the two cylinders from among two knock sensors, this is not meant to be limiting, and that in further examples, a single knock sensor may be selected from among a plurality of knock sensors (such as, three or more knock sensors). It will also be appreciated that while the depicted examples illustrate sensor selections for two cylinders, the selection may be similarly made for a plurality of cylinders (that is, from cylinder 1 through cylinder n in an engine with n cylinders). In one example, the selections may be pre-mapped and stored in a look-up table (for example, in a speed-load based map) in the controller's memory. The look-up table may be accessed by the controller based on changes in engine operating conditions to adjust the sensor selection. In another example, the sensor selections may be dynamically determined and adjusted during engine operation and cylinder combustion. In this way, the selection of knock sensors used to indicate knock and pre-ignition in each of the cylinders may be rapidly and dynamically changed based on operating conditions so that at any given point during engine operation, knock and pre-ignition can be reliably identified for all the cylinders of the engine.

Now turning to FIG. 6, table 600 depicts example sensor selections for a first and a second cylinder of an engine that includes a plurality of knock sensors (such as, a first and a second knock sensor) located at different locations along the engine block. Specifically herein, a plurality of knock-indicating sensors and/or a plurality of pre-ignition-indicating sensors may be selected from among the plurality of knock sensors. By using a plurality of knock sensors for identifying knock or pre-ignition during some conditions, while using a single knock sensor for identifying knock or pre-ignition during other conditions, pre-ignition detection and differentiation from knock may be enhanced in each of the cylinders without the need for dedicated sensors in each cylinder.

During some conditions, an engine controller may dynamically select a plurality of knock-indicating sensors from among the plurality of sensors for identifying knock in the cylinder while dynamically selecting a (single) pre-ignition-indicating sensor from among the plurality of sensors for identifying pre-ignition. Herein, one of the plurality of knock-indicating sensors may be the same as the pre-ignition-indicating sensor. Alternatively, each of the plurality of knock-indicating sensors may be different from the pre-ignition-indicating sensor.

In one example, as shown in table 600, during some conditions (conditions 1-8), knock may be indicated in the first cylinder based on the first and second knock sensor, and pre-ignition may be indicated in the first cylinder based on either the first or the second knock sensor, while knock and pre-ignition is indicated in the second cylinder based on either the first or the second knock sensor. In another example, during other conditions (conditions 17-24), knock may be indicated in the second cylinder based on the first and second knock sensor, and pre-ignition may be indicated in the second cylinder based on either the first or the second knock sensor, while knock and pre-ignition is indicated in the first cylinder based on either the first or the second knock sensor. In still another example, during some conditions (conditions 37-40), knock may be indicated in each of the first and second cylinder based on the first and second knock sensors while pre-ignition is indicated in each of the first and the second cylinder based on either the first or the second knock sensor.

During other conditions, the engine controller may dynamically select a plurality of pre-ignition-indicating sensors from among the plurality of sensors for identifying pre-ignition in the cylinder while dynamically selecting a (single) knock-indicating sensor from among the plurality of sensors for identifying knock. Herein, one of the plurality of pre-ignition-indicating sensors may be the same as the knock-indicating sensor. Alternatively, each of the plurality of pre-ignition-indicating sensors may be different from the knock-indicating sensor.

For example, during some conditions (conditions 9-16), pre-ignition may be indicated in the first cylinder based on the first and second knock sensor, and knock may be indicated in the first cylinder based on either the first or the second knock sensor, while knock and pre-ignition is indicated in the second cylinder based on either the first or the second knock sensor. During other conditions (conditions 25-32), pre-ignition may be indicated in the second cylinder based on the first and second knock sensor, and knock may be indicated in the second cylinder based on either the first or the second knock sensor, while knock and pre-ignition is indicated in the first cylinder based on either the first or the second knock sensor. In still another example, during some conditions (conditions 33-36), pre-ignition may be indicated in each of the first and second cylinder based on the first and second knock sensors, while knock is indicated in each of the first and the second cylinder based on either the first or the second knock sensor.

During still other conditions, a plurality of knock-indicating sensors and a plurality of pre-ignition-indicating sensors may be selected. Herein, at least one of the plurality of pre-ignition-indicating sensors may be the same as at least one of the plurality of knock-indicating sensors (that is, at least one of the pre-ignition indicating sensors may overlap with at least one of the knock-indicating sensors). For example, during some conditions, the same plurality of knock sensors (that is, same set of sensors) may be used to identify knock and pre-ignition. Alternatively, each of the plurality of pre-ignition-indicating sensors may be different from the knock-indicating sensor (that is, none of the pre-ignition indicating sensors may overlap with any of the knock-indicating sensors).

Returning to the examples shown in table 600, during some conditions (conditions 41-44), knock may be indicated in the first cylinder based on one of the first and second knock sensor, and pre-ignition may be indicated in the first cylinder based on each of the first and the second knock sensor, while knock is indicated in the second cylinder based on each of the first and the second knock sensor, and pre-ignition is indicated in the second cylinder based on one of the first and the second knock sensor. During other conditions (conditions 45-48), knock may be indicated in the first cylinder based on each of the first and second knock sensor, and pre-ignition may be indicated in the first cylinder based on one of the first and the second knock sensor, while knock is indicated in the second cylinder based on one of the first and the second knock sensor, and pre-ignition is indicated in the second cylinder based on each of the first and the second knock sensor.

In another example, during some conditions (conditions 49-52), both knock and pre-ignition may be indicated in the first cylinder based on each of the first and second knock sensor, while each of knock and pre-ignition is indicated in the second cylinder based on one of the first and the second knock sensor. During other conditions (conditions 53-56), both knock and pre-ignition may be indicated in the second cylinder based on each of the first and second knock sensor, while each of knock and pre-ignition is indicated in the first cylinder based on one of the first and the second knock sensor.

In another example, during some conditions (conditions 57-58), both knock and pre-ignition may be indicated in the first cylinder based on each of the first and second knock sensor, while knock is indicated in the second cylinder based on each of the first and second knock sensor and pre-ignition is indicated in the second cylinder based on one of the first and the second knock sensor. During other conditions (conditions 59-60), both knock and pre-ignition may be indicated in the first cylinder based on each of the first and second knock sensor, while knock is indicated in the second cylinder based on one of the first and second knock sensor and pre-ignition is indicated in the second cylinder based on each of the first and the second knock sensor.

In the same way, during still other conditions (conditions 61-62), both knock and pre-ignition may be indicated in the second cylinder based on each of the first and second knock sensor, while knock is indicated in the first cylinder based on one of the first and second knock sensor and pre-ignition is indicated in the first cylinder based on each of the first and the second knock sensor. During yet other conditions (conditions 63-64), both knock and pre-ignition may be indicated in the second cylinder based on each of the first and second knock sensor, while knock is indicated in the first cylinder based on each of the first and second knock sensor and pre-ignition is indicated in the first cylinder based on one of the first and the second knock sensor.

In still further examples, each of knock and pre-ignition may be indicated in each of the first and the second cylinder based on a plurality of sensors. In the depicted example (condition 65), each of knock and pre-ignition is indicated in each of the first and the second cylinder based on the first and the second knock sensor. While the depicted example illustrates using the same set of multiple sensors for indicating knock and pre-ignition in the different cylinders, it will be appreciated that in alternate examples, the selections may be partially overlapping or non-overlapping. For example, in an engine that has four knock sensors distributed along the engine block, during some conditions, knock may be indicated in each of the first and second cylinder based on the first and second knock sensor while pre-ignition is indicated in each of the first and second cylinder based on the third and fourth knock sensor. In another example, knock and pre-ignition may be indicated in the first cylinder based on the first and second knock sensor while knock and pre-ignition is indicated in the second cylinder based on the third and fourth knock sensor. Still further combinations may be possible.

It will be appreciated that while the examples depicted in table 600 illustrate selecting a plurality of sensors for at least one of the two cylinders during some conditions, this is not meant to be limiting, and that in further examples, two or more sensors may be selected from among a plurality of sensors (e.g., from among three or more sensors). It will also be appreciated that while the depicted examples illustrate sensor selections for two cylinders, the selection may be similarly made for a plurality of cylinders (that is, from cylinder 1 through cylinder n in an engine with n cylinders). In one example, the selections may be pre-mapped and stored in a look-up table (for example, in a speed-load based map) in the controller's memory.

In some examples, a knock-indicating sensor and a pre-ignition-indicating sensor may be dynamically selected for each of the plurality of engine cylinders from among the plurality of knock sensors based on operating conditions, and further based on cylinder configuration. For example, in engines where engine cylinders are arranged as a group of cylinders (or bank of cylinders), a common sensor (or set of sensors) may be selected for indicating knock and/or pre-ignition for all cylinders on that bank. In one example, the look-up table may have the selections pre-determined and stored in a bank-specific manner. Herein, following the bank-specific detection, bank-specific mitigating actions may be taken, as described in detail herein.

In still further examples, the dynamic selection of sensors for knock and/or pre-ignition detection may be further adjusted based on the pre-ignition count, or history, of each cylinder. In one example, in response to persistent pre-ignition, the number of sensors used to identify pre-ignition may be increased. For example, under a given operating condition, when the pre-ignition count of a cylinder is lower than a threshold count, a first or a second knock sensor may be used to indicate pre-ignition in the cylinder. In comparison, under the same operating condition, when the pre-ignition count of the cylinder is higher than the threshold count, each of the first and second knock sensor (or more than two sensors) may be used to indicate pre-ignition in the cylinder. Similarly, based on the pre-ignition count, the thresholds and/or windows for knock detection or pre-ignition detection may be adjusted. In one example, in response to a cylinder pre-ignition count being higher than a threshold (such as, when persistent pre-ignition is occurring in a cylinder), the pre-ignition detection window may be broadened to start at an earlier timing, and/or end at a later timing. Additionally, the pre-ignition threshold may be lowered. By expanding the pre-ignition detection window and lowering the pre-ignition detection threshold, earlier occurrences of pre-ignition may be rapidly identified, and accordingly mitigating actions may be taken to reduce the persistence of pre-ignition.

Further still, the sensor selection may be adjusted based on the window selection, and vice versa. In one example, broadening of a pre-ignition detection window due to an occurrence of persistent cylinder pre-ignition (or a cylinder pre-ignition count being higher than a threshold) may cause a previous selection of pre-ignition indicating sensors to not suffice. Thus, in response to the broadening of the pre-ignition window, and based on the broadened window, the number and selection of knock-indicating and pre-ignition indicating sensors may be adjusted (e.g., increased). In one example, the engine controller may be configured to adaptively "learn" and accordingly update the look-up table based on engine pre-ignition history and cylinder pre-ignition count.

In this way, during conditions when the output of any single knock sensor may not be sufficient to clearly and reliably identify and differentiate cylinder knock and cylinder pre-ignition, a plurality of sensors may be used to better indicate and differentiate knock and pre-ignition in at least one engine cylinder.

Now turning to FIG. 7, graphs 700 and 750 show example outputs from a first and a second knock sensor, respectively, the first and second knock sensor positioned at distinct locations along an engine block. Based on the output of the sensors in each of a knock window and a pre-ignition window, knock and pre-ignition may be determined and differentiated for each of a first and a second cylinder.

In the depicted example, based on the prevalent operating conditions, knock is indicated in the first cylinder based on an output of the first knock sensor, while pre-ignition is indicated in the first cylinder based on an output of the second knock sensor. Additionally, knock is indicated in the second cylinder based on the output of the second knock sensor, while pre-ignition is indicated in the second cylinder based on an output of the first knock sensor.

Graph 700 shows the output of the first knock sensor along the y-axis, as estimated at different crank angle degrees (CAD). A controller may estimate the (first) output of the first knock sensor in a first crank angle window (window1a) and indicate knock in the first cylinder based on the first output as compared to a first knock threshold 701 in the first window. The controller may also estimate the (first) output of the first knock sensor in a second crank angle window (window2a) and indicate pre-ignition in the second cylinder based on the first output as compared to a second pre-ignition threshold 702 in the second window. In the depicted example, the first knock threshold 701 is lower than the second pre-ignition threshold 702. Also in the depicted example, the first crank angle window (window1a) is a later window starting at CAD2 and continuing to CAD4, while the second crank angle window (window2a) is an earlier window starting at CAD1 and continuing to CAD3. That is, the first window partially overlaps with the second window (the overlap region being between CAD2 and CAD3). In alternate examples, the first and second windows may be fully overlapping (for example, a first window being the same as the second window or a first, smaller window within a second, larger window). Further still, the windows may be fully distinct (as shown below for the second knock sensor).

As shown in graph 700, in response to the output of the first knock sensor exceeding the first threshold 701 in the first window (window1a), knock may be indicated in the first cylinder. Also, in response to the output of the first knock sensor exceeding the second threshold 702 in the second window (window2a), pre-ignition may be indicated in the second cylinder. In this way, by using a later window with a lower threshold for detecting knock while using an earlier window with a higher threshold for detecting pre-ignition, earlier and more intense abnormal combustion events related to pre-ignition may be better differentiated from later and less intense abnormal combustion events related to knocking using the same knock sensor.

Graph 750 shows the output of the second knock sensor along the y-axis, as estimated at different crank angle degrees. A controller may estimate the (second) output of the second knock sensor in a first crank angle window (window1b) and indicate knock in the second cylinder based on the second output as compared to a first knock threshold 751 in the first window. The controller may also estimate the (second) output of the second knock sensor in a second crank angle window (window2b) and indicate pre-ignition in the first cylinder based on the second output as compared to a second pre-ignition threshold 752 in the second window. In one example, the first knock threshold 751 may be lower than the second pre-ignition threshold 752. In the depicted example, the first crank angle window (window1b) is a later window starting at CAD7 and continuing to CAD8, while the second crank angle window (window2b) is an earlier window starting at CAD5 and continuing to CAD6. That is, the first window does not overlap with the second window.

As shown, in response to the output of the second knock sensor not exceeding the first threshold 751 in the first window (window1b), knock may not be determined in the second cylinder. Also, in response to the output of the second knock sensor not exceeding the second threshold 752 in the second window (window 2b), pre-ignition may not be determined in the second cylinder.

While the depicted examples show distinct first and second windows for the first and second sensors, it will be appreciated that in alternate examples, the different sensors may have the same first and second windows. Similarly, while the depicted example shows distinct first thresholds and distinct second thresholds for the first and second sensors, in alternate examples, the different sensors may have the same thresholds in their first and second windows. As previously indicated, in still other examples, one or more of the sensors may have fully overlapping or partially overlapping first and second windows.

While the depicted example illustrates indicating knock and pre-ignition based on the output of the first or second knock sensor, it will be appreciated that in alternate examples, as indicated in FIGS. 5-6, knock and pre-ignition may be indicated based on the output of the first and the second knock sensor. This may include, for example, indicating knock when a combined output of the first and second knock sensor in the first (later) window exceeds the first (lower) threshold, and indicating pre-ignition when a combined output of the first and second knock sensor in the second (earlier) window exceeds the second (higher) threshold. In another example, this may include indicating knock when an output of each of the first and second knock sensor in the first window exceeds the first threshold, and indicating pre-ignition when an output of each of the first and second knock sensor in the second window exceeds the second threshold.

Following detection and differentiation, different control actions may be taken to address knock and pre-ignition. For example, in response to the indication of knock in the first cylinder, ignition spark timing of the first cylinder may be retarded away from MBT. In response to the indication of pre-ignition in the second cylinder, cylinder fuel injection to the second cylinder may be enriched for a threshold number of combustion events. The degree and/or duration of the cylinder enrichment may be adjusted based on the pre-ignition count (or history) of the second cylinder.

In some examples, the knock mitigation may be performed in a cylinder-specific manner while the pre-ignition mitigation is performed in a bank-specific manner. For example, in response to the indication of pre-ignition in the second cylinder, wherein the first and second cylinders are arranged on a common bank (that is, in the same group of cylinders), the controller may enrich cylinder fuel injection to the common bank for a predefined number of combustion events. In another example, in response to an occurrence of pre-ignition in the second cylinder, but not in the first cylinder, wherein the first cylinder is on a first bank (or first group of cylinders) and the second cylinder is on a second, different bank (or a second, different group of cylinders), the controller may enrich cylinder fuel injection of the second bank more (e.g., higher degree of enrichment and/or longer duration) than the first bank.

In still another example, in response to an occurrence of pre-ignition in the second cylinder and in the first cylinder, wherein the first cylinder is on a first bank (or first group of cylinders) and the second cylinder is on a second, different bank (or a second, different group of cylinders), the controller may enrich fuel injection of the second bank based on the pre-ignition count of the second cylinder while enriching fuel injection of the first bank based on the pre-ignition count of the first cylinder. As such, enriching fuel injection of a bank based on the pre-ignition count of a cylinder may include increasing the degree of enrichment and/or duration of enrichment (e.g., time, number of combustion events, etc.) of the bank as the pre-ignition count of the affected cylinder increases. By enriching the pre-ignition affected cylinder, the occurrence of further cylinder pre-ignition events is reduced.

In addition to enriching the pre-ignition affected cylinder (or bank), a cam timing of the affected bank may be adjusted to limit an engine load of the cylinder. Alternatively, in camless systems, one or more of a cylinder port throttle, an electrically actuated intake valve and an electrically actuated exhaust valve of the cylinder may be adjusted to limit the load of the affected cylinder only. In either case, the load limiting may be increased as the cylinder pre-ignition count increases. By load-limiting the cylinder, the air-charge or air mass to the cylinder may be limited, thereby reducing the occurrence of further pre-ignition events.

In one example, a method of operating an engine including a first and a second knock sensor at different locations on an engine block comprises, during a first condition, indicating knock or pre-ignition in a cylinder based on one of the first and second knock sensor, and during a second condition, indicating knock or pre-ignition in the cylinder based on the other of the first and second knock sensor. In one example, during the first condition, the indication includes indicating knock and pre-ignition in the cylinder based on the first knock sensor, and during the second condition, the indication includes indicating knock and pre-ignition in the cylinder based on the second knock sensor. In another example, during the first condition, the indication includes indicating knock in the cylinder based on the first knock sensor and pre-ignition in the cylinder based on the second knock sensor, while during the second condition, the indication includes indicating knock in the cylinder based on the second knock sensor and indicating pre-ignition in the cylinder based on the first knock sensor.

In another example, a method of operating an engine including a first and a second knock sensor at different locations comprises, during a first condition, indicating knock in a cylinder based on one of the first and second knock sensor while indicating pre-ignition in the cylinder based on each of the first and second knock sensor, and during a second condition, indicating knock in the cylinder based on each of the first and second knock sensor while indicating pre-ignition in the cylinder based on one of the first and second knock sensor.

As an example, indicating knock based on one of the first and second knock sensor may include indicating knock in a first cylinder based on the first knock sensor and indicating knock in a second cylinder based on the second knock sensor. As another example, indicating knock based on one of the first and second knock sensor may include indicating knock in each of a first and a second cylinder based on either the first knock sensor or the second knock sensor. Likewise, as one example, indicating pre-ignition based on one of the first and second knock sensor may include indicating pre-ignition in a first cylinder based on the first knock sensor and indicating pre-ignition in a second cylinder based on the second knock sensor. As another example, indicating pre-ignition based on one of the first and second knock sensor may include indicating pre-ignition in each of a first and a second cylinder based on either the first knock sensor or the second knock sensor.

In still another example, an engine system comprises an engine cylinder, a plurality of knock sensors distributed along an engine block, a variable cam timing mechanism including a cam coupled to the cylinder, and a controller with computer readable code carrying instructions for, during engine operation, dynamically selecting a knock-indicating sensor from among the plurality of knock sensors for identifying knock in the cylinder, and dynamically selecting a pre-ignition-indicating sensor from among the plurality of knock sensors for identifying pre-ignition in the cylinder, the selections based on operating conditions. In response to an indication of knock in the cylinder, the controller may retard a spark ignition timing, and in response to an indication of pre-ignition in the cylinder, the controller may adjust the cam timing to limit an engine load of the cylinder. The enriching of the cylinder may be based on a cylinder pre-ignition count.

In this way, by selecting one or more knock sensors, from among the available knock sensors, for indicating knock and pre-ignition in an engine cylinder, each of knock and pre-ignition may be more accurately identified and differentiated from each other. By adjusting the selection for each cylinder, the detection may be improved for each cylinder with the available sensors, and without necessitating additional sensors. By improving the performance and response-time of pre-ignition detection, pre-ignition mitigation can be expedited, thereby reducing engine degradation due to pre-ignition.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine including a plurality of knock sensors distributed on an engine block, comprising:
   during engine operation: dynamically selecting a knock-indicating sensor from among the plurality of knock sensors for identifying knock in a cylinder, and dynamically selecting a pre-ignition-indicating sensor from among the plurality of knock sensors for identifying pre-ignition in the cylinder, the selections based on operating conditions, where during a first condition, the knock-indicating sensor is the same as the pre-ignition-indicating sensor, and during a second condition, the knock-indicating sensor is different from the pre-ignition-indicating sensor, the selections being performed for each engine cylinder.

2. The method of claim 1, further comprising,
   indicating knock in response to an output of the knock-indicating sensor exceeding a first, lower threshold; and
   indicating pre-ignition in response to an output of the pre-ignition-indicating sensor exceeding a second, higher threshold.

3. The method of claim 2, wherein the output of the knock-indicating sensor is estimated in a first, later window; and wherein the output of the pre-ignition-indicating sensor is estimated in a second, earlier window, wherein the first and second windows are crank angle windows.

4. The method of claim 3, wherein the first window partially overlaps with the second window.

5. The method of claim 2, further comprising, retarding ignition spark timing of the cylinder in response to the indication of knock, and enriching fuel injection to the cylinder in response to the indication of pre-ignition.

6. A method of operating an engine including a plurality of knock sensors distributed on an engine block, comprising:
   during engine operation: dynamically selecting a knock-indicating sensor from among the plurality of knock sensors for identifying knock in a cylinder, and dynamically selecting a pre-ignition-indicating sensor from among the plurality of knock sensors for identifying pre-ignition in the cylinder, the selections based on operating conditions, including during a first condition, dynamically selecting a plurality of knock-indicating sensors from among the plurality of knock sensors for identifying knock in the cylinder; during a second condition, dynamically selecting a plurality of pre-ignition-indicating sensors from among the plurality of knock sensors for identifying pre-ignition in the cylinder; and during a third condition, dynamically selecting a plurality of knock-indicating sensors from among the plurality of knock sensors for identifying knock in the cylinder, and dynamically selecting a plurality of pre-ignition-indicating sensors from among the plurality of knock sensors for identifying pre-ignition in the cylinder, wherein during the first condition, each of the plurality of knock-indicating sensors is different from the pre-ignition-indicating sensor; during the second condition, each of the plurality of pre-ignition-indicating sensors is different from the knock-indicating sensor; and during the third condition, each of the plurality of knock-indicating sensors is different from each of the pre-ignition-indicating sensors.

7. The method of claim 6, further comprising,
   indicating knock in response to an output of the knock-indicating sensor exceeding a first, lower threshold; and
   indicating pre-ignition in response to an output of the pre-ignition-indicating sensor exceeding a second, higher threshold.

8. The method of claim 7, wherein the output of the knock-indicating sensor is estimated in a first, later window; and wherein the output of the pre-ignition-indicating sensor is estimated in a second, earlier window, wherein the first and second windows are crank angle windows.

9. The method of claim 8, wherein the first window partially overlaps with the second window.

10. The method of claim 7, further comprising, retarding ignition spark timing of the cylinder in response to the indication of knock, and enriching fuel injection to the cylinder in response to the indication of pre-ignition.

* * * * *